United States Patent [19]

Koenigbauer et al.

[11] Patent Number: 5,209,091
[45] Date of Patent: May 11, 1993

[54] APPARTUS FOR SETTING THE SHUT HEIGHT OF A PRESS

[76] Inventors: Gerald J. Koenigbauer, 606 Woods La., Grosse Pointe Woods, Mich. 48236; August F. Pitonyak, 13058 Parkridge, Shelby Township, Mich. 48315; John H. Jeffcoat, 8188 Pacton Dr., Utica, Mich. 48317; David Kaslatas, 28520 Milton, Warren, Mich. 48092

[21] Appl. No.: 971,639
[22] Filed: Nov. 5, 1992
[51] Int. Cl.$^5$ .................. B21D 37/00; B21J 13/00
[52] U.S. Cl. .................................. 72/21; 72/26; 72/446; 100/48
[58] Field of Search .............. 72/21, 26, 1, 6, 389, 72/446; 100/48, 46, 49

[56] References Cited

U.S. PATENT DOCUMENTS

| | | | |
|---|---|---|---|
| 2,882,766 | 4/1959 | Towler | 72/21 |
| 4,148,203 | 4/1979 | Farazandeh et al. | 72/21 |
| 4,489,578 | 12/1984 | Nagai et al. | 72/21 |
| 4,890,468 | 1/1990 | Frisch et al. | 72/21 |
| 4,936,126 | 6/1990 | Sato | 72/21 |
| 5,113,756 | 5/1992 | Fujii | 72/21 |

FOREIGN PATENT DOCUMENTS 1011314  4/1983  U.S.S.R. ........................... 72/21

Primary Examiner—David Jones
Attorney, Agent, or Firm—Edward A. Craig

[57] ABSTRACT

A portable measuring device used for setting the shut height of the dies of a press. The measuring device includes a gauge or indicator releasably mounted on a finished surface of one of the dies. A paddle releasably mounted on a finished surface of the other die engages an indicator probe when the dies are relatively moved toward each other, to provide a measurement of the distance between the dies. This measurement is used to set the shut height of the dies.

12 Claims, 2 Drawing Sheets

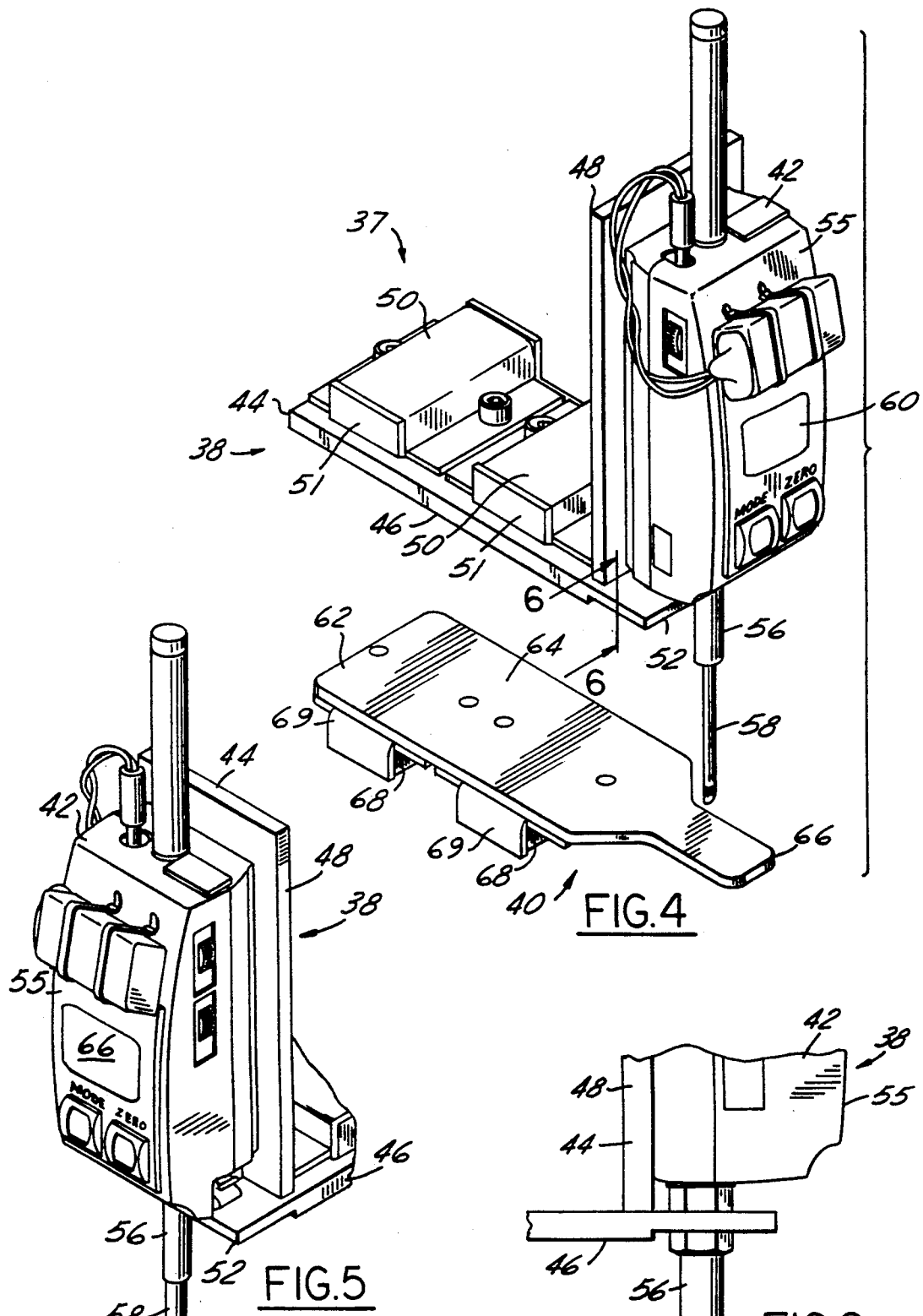

APPARATUS FOR SETTING THE SHUT HEIGHT OF A PRESS

This invention relates generally to apparatus for setting the shut height of the dies in a press.

BACKGROUND AND SUMMARY

Stamping dies are mounted in stamping presses for forming sheet metal into desired shapes, such as car doors, hoods and the like. Parts are formed by placing the sheet metal between opposed dies and bringing the dies together by means of a reciprocating drive mechanism.

The stamping press typically has a ram on which the upper die is mounted, and a bolster which mounts the lower die. The ram and upper die are raised to permit insertion of the sheet metal. The ram is moved to a lower position to form a stamping between the dies. The exact location of this lower position is of importance in stamping out uniform and dimensionally consistent parts.

When the ram is in its lower position, only a small space exists between the dies. Because this space is so small, it cannot conveniently be measured directly. This invention provides apparatus for indirectly yet accurately measuring this space to determine the shut height of the die.

The dies of a stamping press have confronting finished surfaces which are provided for the insertion of a steel cylinder block to prevent inadvertent shutting of the dies when the press is being worked on by die setters and other personnel. These finished surfaces are employed in the practice of the present invention.

The apparatus of this invention includes two devices. One is temporarily mounted on the finished surface of one die and comprises an indicator having a depressible probe. The other comprises a probe contact member temporarily mounted on the other die in position to be contacted by and depress the probe upon relative movement of the dies toward one another. The indicator registers the separation of the dies by the extent to which the probe is depressed.

More specifically, the indicator is secured to a bracket and the bracket is mounted on the finished surface of one of the dies by a magnet or magnets. The probe contact member is preferably a rigid bar in the form of an elongated paddle secured to the finished surface of the other die by a magnet or magnets.

In a preferred form of the invention, the indicator is located outside the path of relative movement of the dies and the probe is in the form of an elongated plunger extending parallel to the path.

It is an object of this invention to provide apparatus for setting the shut height of the dies of a press having the foregoing features.

Other objects are to provide apparatus for setting the shut height of dies which is of rugged and durable construction, capable of being readily and inexpensively manufactured, and easy to install and operate.

These and other objects, features and advantages of the invention will become more apparent as the following description proceeds, especially when taken with the accompanying drawings.

BRIEF DESCRIPTION OF THE DRAWINGS

FIG. 4 is an enlarged perspective view of the measuring apparatus.

FIG. 5 is a perspective view of the indicator portion of the measuring apparatus.

FIG. 6 is a fragmentary elevational view of a part of the indicator portion of the measuring apparatus, taken on the line 6—6 in FIG. 4.

DETAILED DESCRIPTION

Figure 1:
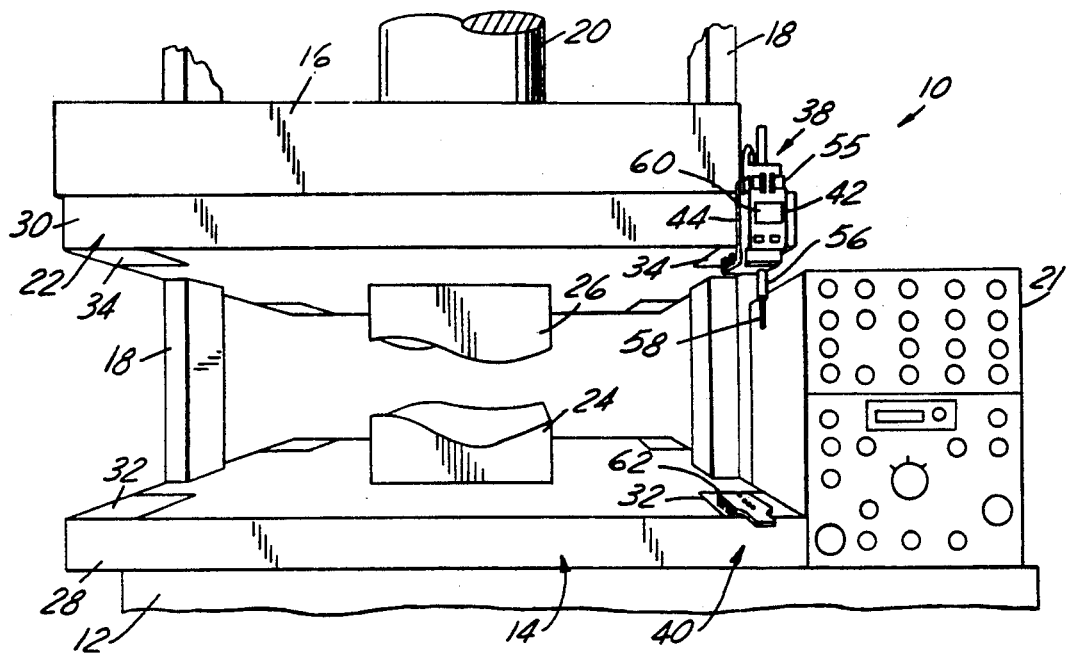
FIG. 1 is a front perspective view of a stamping press having apparatus for measuring the shut height of the dies, constructed in accordance with the invention.

Referring now more particularly to the drawings, the stamping press 10 has a stationary bolster 12 on which is mounted a lower die 14. A ram 16 above the bolster and lower die is supported for vertical reciprocation on vertical side posts or rails 18 by a drive mechanism 20 operated by a control panel 21. An upper die 22 is mounted on the ram in opposed relation to the lower die 14 and moves with the ram toward and away from the lower die.

The lower and upper dies 14 and 22 have complementary die parts 24 and 26 shaped to form a stamping when the upper die is moved to its lowermost position. The die parts 24 and 26 face one another and are formed on the horizontal, rectangular die plates 28 and 30. The die plates 28 and 30 have horizontal finished surfaces 32 and 34 at their edges. The finished surfaces 32 and 34 are of a material, such as steel, capable of being attracted by a magnet. Preferably, the finished surfaces 32 are at the four corners of the lower die plate 28 and confront the respective finished surfaces 34 at the four corners of the upper die plate 30. To prevent inadvertent shutting of the dies when the press is being worked on by die setters and others, a steel cylinder block may be placed between any two confronting finished surfaces.

The apparatus for setting the shut height of the dies comprises a portable measuring device 37 which includes two parts 38 and 40. As shown, the part 38 is mounted on the upper die 22 and the part 40 is mounted on the lower die 14.

The measuring device part 38 comprises a gauge or indicator 42 and a mounting bracket 44. The mounting bracket is an L-shaped member having legs 46 and 48 extending perpendicular to one another.

The leg 46 extends under one of the finished surfaces 34 of the upper die. Two spaced magnets 50 are rigidly secured by mounting brackets 51 to the top of leg 46. Magnets 50 have coplanar upper surfaces which are magnetically applied to the finished surface 34 and releasably hold the leg 46 affixed thereto in horizontal position. The leg 46 has an end 52 which extends outwardly beyond the side of the upper die.

Figure 2:
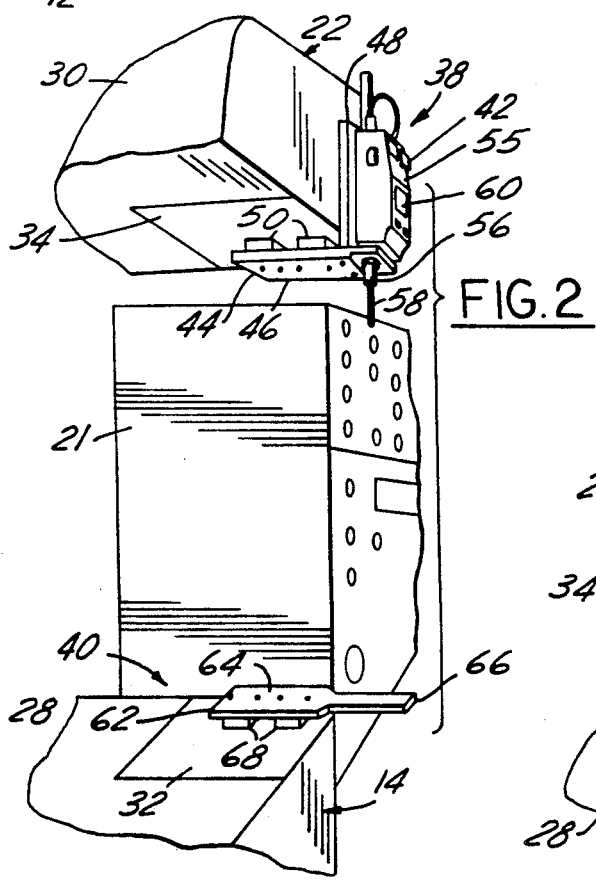
FIG. 2 is a perspective view of a portion of the stamping press and measuring apparatus as seen from a different angle, with the press open.
Figure 3:
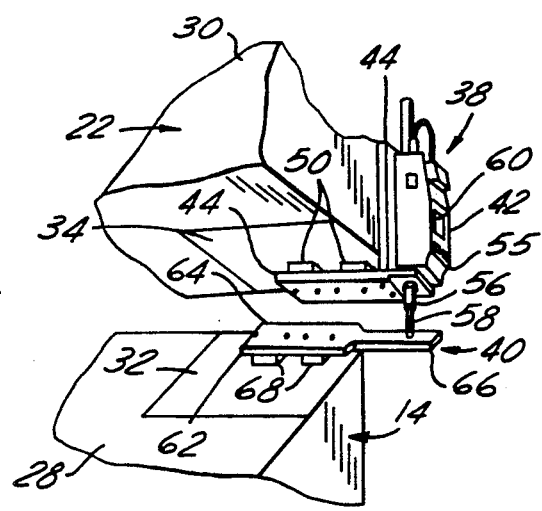
FIG. 3 is a perspective view similar to FIG. 2 but with the press closed.

The leg 48 of bracket 44 is rigidly secured to the leg 46 and extends vertically upwardly. The indicator 42 has a housing 55 secured to the outer side of the leg 48 outside the path of movement of the upper die. The housing 55 rests on the outwardly extending end 52 of leg 46. The indicator 42 has a vertical barrel 56 which is parallel to the path of the upper die and extends from housing 55 beneath the end 52 of leg 46. An elongated vertical probe 58 is reciprocable within the barrel. The probe 58 is in the form of an elongated plunger and is spring-urged to the extended position shown in FIGS. 1, 2 and 4 and can be depressed upwardly within the barrel as described more fully hereinafter. The indicator housing 55 has a display window 60 where a dial or the like registers and holds the position of the probe, that is, the extent to which it is depressed. The probe moves with the indicator housing 55 outside the path of the upper die.

The part 40 of the measuring device 37 is a rigid bar in the form of a relatively thin flat blade or paddle 62 that serves as a probe contact member. Paddle 62 is of uniform thickness and has a relatively wide body portion 64 and an integral, somewhat narrower terminal portion 66 extending longitudinally from the body portion. The body portion 64 extends over the finished surface 32 of the lower die opposed to the finished surface of the upper die to which the indicator 42 is applied. Two spaced magnets 68 are rigidly secured by mounting brackets 69 to the bottom of the body portion 64 and have coplanar lower surfaces which are magnetically applied to the finished surface 32 of the lower die to releasably hold the paddle 62 affixed thereto in horizontal position. The terminal portion 66 of the paddle 62 extends beyond the side of lower die 14 into the path of the probe.

In order to set the shut height of the press, the indicator 42 and bracket 44 are temporarily mounted on one of the finished surfaces 34 of the upper die 22 by magnets 50, as shown in the drawings. As also shown, the paddle 62 is temporarily mounted on the opposing finished surface 32 of the lower die 14 by magnets 68, with the terminal portion 66 of the paddle in the path of movement of the indicator probe 58. The ram 16 is then cycled to cause the upper die to approach the lower die. The probe 58 is outside the path of movement of the upper die and moves vertically downward with the upper die until it contacts and is depressed by the terminal portion 66 of paddle 62. The degree or extent of probe depression is measured by the indicator 42 and is registered and held by the dial in the display window 60 and is a measure of the distance between the finished surfaces 32 and 34 of the dies. This is also an indirect measurement of the distance between the die parts 24 and 26. The low point in the cycle of the upper die can be adjusted as desired based on the measurement resulting from this use of the indicator 42 and paddle 62, thereby setting the shut height of the press and producing the desired thickness of stampings. Once the shut height has been determined, the measuring device is removed from the dies and the press is ready to stamp out dimensionally consistent parts.

Only one measurement is needed for die setting. However, to be sure that the ram and dies are level, a reading can be taken at each corner of the dies.

What is claimed is:

1. Apparatus for setting the shut height of opposed first and second dies of a press supported for relative movement toward and away from each other and having confronting finished surfaces, comprising a portable measuring device, said measuring device having first and second parts, first mounting means for releasably mounting said first part on said finished surface of said first die, second mounting means for releasably mounting said second part on said finished surface of said second die, said first part comprising an indicator having a depressible probe, and said second part comprising a probe contact member in position to be contacted by and depress said probe upon relative movement of said dies toward one another, said indicator registering the separation of said dies by the extent to which said probe is depressed.

2. Apparatus as defined in claim 1, wherein said first mounting means comprises a magnet engaging said finished surface of said first die.

3. Apparatus as defined in claim 1, wherein said first mounting means comprises a bracket to which said indicator is secured, and a magnet carried by said bracket and engaging said finished surface of said first die.

4. Apparatus as defined in claim 1, wherein said second mounting means comprises a magnet engaging said finished surface of said second die.

5. Apparatus as defined in claim 1, wherein said probe contact member is a rigid bar, and said second mounting means comprises a magnet carried by said rigid bar and engaging said finished surface of said second die.

6. Apparatus as defined in claim 1, wherein said finished surface of each die is located at an edge thereof.

7. Apparatus as defined in claim 1, wherein said first mounting means comprises a bracket having a first portion overlying said finished surface of said first die, a magnet secured to said first bracket portion and engaging said finished surface of said first die, said bracket having a second portion outside the path of relative movement of said dies to which said indicator is secured, said probe contact member is a rigid bar in the form of an elongated paddle having a body portion overlying the finished surface of said second die, and a magnet secured to said body portion of said paddle and engaging said finished surface of said second die, said paddle having a terminal portion projecting longitudinally from said body portion beyond the path of relative movement of said dies to a position in which it is adapted to be contacted by said probe.

8. Apparatus as defined in claim 7, wherein said indicator comprises a housing having display indicator means for registering probe depression, and said probe is in the form of an elongated plunger extending parallel to said path, said plunger being mounted on said housing for longitudinal movement and movable longitudinally when depressed.

9. Apparatus as defined in claim 8, wherein said bracket is generally L-shaped, said first portion of said bracket constituting one leg of the L and said second portion of said bracket constituting the other leg of the L.

10. Apparatus as defined in claim 9, wherein said paddle is a flat strip of rigid material of uniform thickness and said terminal portion is an integral extension of said body portion and is relatively narrow in comparison to said body portion.

11. Apparatus as defined in claim 10, wherein said first and second dies have rectangular die plates, said finished surface of each die plate being located at a corner thereof.

12. Apparatus as defined in claim 11, wherein said die plates have additional confronting finished surfaces at the remaining corners thereof on which said first and second parts of said measuring device may be releasably mounted to take additional measurements.

* * * * *

UNITED STATES PATENT AND TRADEMARK OFFICE
CERTIFICATE OF CORRECTION

PATENT NO. : 5,209,091
DATED : May 11, 1993
INVENTOR(S) : Koenigbauer, et. al.

It is certified that error appears in the above-indentified patent and that said Letters Patent is hereby corrected as shown below:

On the Title page, item [73], Assignee: insert--Chrysler Corporation--.

Signed and Sealed this

Twenty-eighth Day of June, 1994

*Attest:*

BRUCE LEHMAN

*Attesting Officer*  *Commissioner of Patents and Trademarks*